United States Patent [19]
White et al.

[11] 3,709,863
[45] Jan. 9, 1973

[54] METHOD FOR EXTRUDING POLYACETYLENES TO PRODUCE HIGH STRENGTH GRAPHITE PRECURSORS

[75] Inventors: Dwain M. White, Schenectady; Stanley Y. Hobbs, Scotia, both of N.Y.

[73] Assignee: General Electric Company, Schenectady, N.Y.

[22] Filed: Feb. 24, 1971

[21] Appl. No.: 118,472

[52] U.S. Cl..........260/30.2, 23/209.1 F, 260/30.6 R, 260/32.4, 260/33.6 UA, 260/33.8 UA
[51] Int. Cl. ..........................C08f 45/28, C01b 31/04
[58] Field of Search..260/33.6 UA, 33.8 UA, 88.2 D, 260/94.1; 23/209.1 F; 264/29

[56] References Cited

UNITED STATES PATENTS

| | | | |
|---|---|---|---|
| 3,299,016 | 1/1967 | Sonnenfeld | 260/88.2 D |
| 3,254,140 | 5/1966 | Hagemeyer | 260/88.2 D |
| 3,534,251 | 10/1970 | Brenschede | 260/31.8 AN |
| 3,300,456 | 1/1967 | Hay | 260/88.2 D |
| 3,332,916 | 7/1967 | Hay | 260/80 L |

Primary Examiner—Morris Liebman
Assistant Examiner—P. R. Michl
Attorney—Richard R. Brainard, Paul A. Frank, Charles T. Watts, William A. Teoli, Frank L. Neuhauser, Oscar B. Waddell and Joseph B. Forman

[57] ABSTRACT

A method is provided for extruding polyacetylene to produce extrudate which is convertible to high strength graphite fiber by extruding the polyacetylene in the form of a blend of the polyacetylene, and a mixture of a volatile plasticizer such as ortho-dichlorobenzene and a substantially non-volatile plasticizer, such as 1,4-diphenylbutadiyne.

7 Claims, No Drawings

METHOD FOR EXTRUDING POLYACETYLENES TO PRODUCE HIGH STRENGTH GRAPHITE PRECURSORS

The present invention relates to a method for extruding polyacetylene to produce extrudate which can be converted to high strength graphite fiber by the employment of a mixture of plasticizers to produce a melt-extrudable polyacetylene blend.

Prior to the present invention, various attempts were made to carbonize numerous organic polymers in fibrous form having a high carbon content to provide for high strength graphite fibers. As shown in Johnson et al. U.S. Pat. No. 3,412,062, for example, carbon fibers having a high tensile strength and Young's modulus can be made from polyacrylonitrile. Although desirable results can be achieved with polyacrylonitrile fibers, these fibers must be subjected to a preliminary oxidation treatment to stabilize the fibers prior to graphitization. Although the preoxidation treatment results in fiber stability, it also can result in considerable fiber weight loss and reduction in carbon values.

It also is generally known that polyacetylenes, for example, polymers shown by Hay U.S. Pat. Nos. 3,300,456; 3,332,916; 3,519,611, British Pat. No. 1,149,697, etc. can be converted to the carbonaceous state without significant weight loss or carbon values. In order to convert such polyacetylenes to carbon and graphite fiber, it is necessary to produce a precursor fiber which can be carbonized. Direct heating of polyacetylenes to permit extrusion of polymer has been unsuccessful because the acetylenic bond can be activated at temperatures above 150°C rendering the polymer intractable. Efforts utilizing various organic solvents as plasticizers often have been unsuccessful, due to such factors as plasticizer incompatability, volatility, etc. For example, some solvents have been found effective for extruding polyacetylene in the form of a polyacetylene-solvent blend, but have failed to serve as suitable plasticizers after the formation of the extrudate due to volatility of the solvent. Under such circumstances, the extruded fiber can be difficult to draw to provide fiber orientation, or the solvent can evaporate too rapidly from the fiber interior to the air-fiber interface to produce flaws in the walls of the resulting heat stabilized fiber or carbonized product resulting therefrom.

The present invention is based on the discovery that polyacetylenes can be advantageously melt extruded, and thereafter treated in subsequent steps, such as drawing and heat stabilizing, and finally being subjected to graphitizing conditions with a substantial reduction in fiber flaws, and without severe drawing limitations due to loss of plasticizer, by melt extruding the polyacetylene in the form of a blend with a mixture of a volatile plasticizer and a substantially non-volatile plasticizer, as defined hereinafter. Among the advantages achieved by the use of a mixed plasticizer system in the practice of the invention, is that the volatile plasticizer facilitates the initial extrusion of the polyacetylene prior to its subsequent volatilization from the extrudate, while the substantially non-volatile plasticizer is retained in the extruded polyacetylene to facilitate the drawing of the fiber for purposes of orientation and the like. A further feature of the present invention, is the employment of a substantially non-volatile plasticizer such as 1,4-diphenylbutadiyne, which can be chemically incorporated into the fiber and which has been found to enhance the weight percent yield in carbon values when the fiber has been graphitized. In addition, as a result of what is believed to be the plasticizing action of the substantially non-volatile plasticizer which is retained during graphitization, the fiber experiences an increase in tensile psi and modulus compared to graphite precursor free of such substantially non-volatile plasticizer.

There is provided by the present invention a method for making polyacetylene fiber convertible to high strength graphite by being subjected to graphitization temperatures up to 3300°C, while under substantially non-oxidizing conditions, based on the improvement of making the graphite from a heat stabilized polyacetylene extrudate of a blend of polyacetylene and a mixture of a volatile plasticizer and a substantially non-volatile plasticizer.

The polyacetylenes which can be employed in the practice of the invention contain chemically combined —C≡C— units and can consist essentially of chemically combined carbon atoms and hydrogen atoms, or chemically combined carbon atoms, hydrogen atoms, and oxygen atoms, and in particular instances, in addition to the afore-mentioned atoms, chemically combined sulfur atoms, nitrogen atoms, and mixtures thereof.

Included by the polyacetylenes which can be utilized in the practice of the invention, are polymers containing in addition to —C≡C— units, divalent radicals derived from diethynyl aromatic compounds, such as diethynyl benzene. Some of the polyacetylenes which can be employed in the practice of the invention, are shown by Hay U.S. Pat. No. 3,300,456, and include polymers having the formula, (1) $H\text{---}(\!\!\text{---}C\!\equiv\!C\text{---}R\text{---}C\!\equiv\!C\text{---}\!\!)_n\text{---}H$ where R is a divalent hydrocarbon radical, and n has a value of at least 10. These polyacetylenes can be derived by oxidative coupling of para- and meta-diethynylbenzene and mixtures thereof. Additional polyacetylenes which can be employed are, for example, polymers shown in the above-mentioned British Pat. No. 1,149,697, which can consist essentially of chemically combined units of the formula, (2) $-C\equiv C-(CH_2O)_m-R^1-(OCH_2)_m-C\equiv C-$ , and mixtures of formula (2) units, and diethynylaryl units derived from polymers of formula (1), where $R^1$ is selected from R radicals defined in formula (1),

and —RXR—, Y is selected from —OQ and

radicals, Q is selected from monovalent hydrocarbon radicals and halogenated monovalent hydrocarbon radicals, $R^2$ is a trivalent aryl radical, X is a member selected from

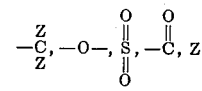

is selected from hydrogen and monovalent hydrocarbon radicals, such as methyl or phenyl, and m has a value of 0 or 1.

In addition to polyacetylenes of formulas (1) and (2), there also can be employed polyacetylene terpolymers shown in copending application of Dwain M. White, filed concurrently herewith and assigned to the same assignee as the present invention. Some of these polyacetylene terpolymers consist essentially of chemically combined dipropargyl bisphenol-A ether units, para-diethynylbenzene units, and meta-diethynylbenzene units; diethynylalkylene units, and the aforementioned diethynylbenzene units, and optionally either terpolymer can have chemically combined acetylene units. Polyesters having acetylenic bonds in the chain also can be employed, as shown by Sladkov et al., Academy Science, U.S.S.R., Bulletin Chemical Science, 1220—1222, (1963). Some of these polyacetylenes can be made by reacting an acetylenic dicarboxylic acid and a diol such as hexanediol.

Radicals included by R of formula (1), are for example, arylene radicals, such as phenylene, xylylene, tolylene, anthrylene, etc.; alkylene radicals such as methylene, dimethylene, trimethylene, pentamethylene, hexamethylene, etc.; halogenated derivatives of such arylene and alkylene radicals, such as chlorophenylene, chlorotolylene, bromopentamethylene, etc. Radicals included by $R^1$ are, for example, the aforementioned R radicals, and weight in the range of from about 200 to 500. There are included by the substantially non-volatile plasticizers which can be employed in the invention, acetylenic compounds such as 1,4-diphenylbutadiyne, trans and cis- 1,4-diphenyl-butenyne, 1,3-bis(phenylbutadiynyl) benzene.

The extrudable blends which can be employed in the practice of the invention, having the polyacetylene mixed with the aforementioned volatile plasticizer and non-volatile plasticizer, can be conveniently made by blending the plasticizers in the form of a mixture with the polyacetylene. There can be employed a proportion of from about 1 to 10 parts, and preferably from about 2 to about 4 parts by weight of the volatile plasticizer, per part of the polyacetylene, and from 0.01 to 1, and preferably 0.05 to 0.5 parts of non-volatile plasticizer, per part of the polyacetylene. Mixing of the various ingredients can be readily achieved with standard mixing equipment, a Patterson-Kelley-V blender, Henchell Mill, etc. In instances where the volatile or non-volatile plasticizer are solids at room temperature, mixing can be facilitated by melting one or both of the plasticizers at temperatures below 150°C to avoid undue crosslinking the polyacetylene.

Experience has shown that optimum results can sometimes be achieved when the polyacetylene extrudate is allowed to age for 12 to 48 hours or more, at temperatures in the range of from 0°C to 25°C to facilitate the slow loss of the volatile plasticizer to avoid

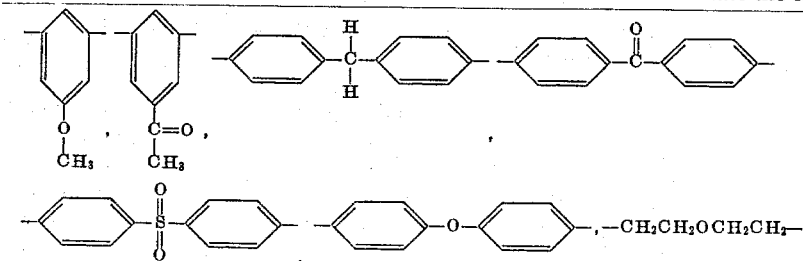

Radicals included by $R^2$ are

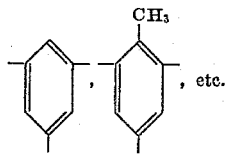

The volatile organic plasticizer which can be employed in the practice of the present invention includes any organic solvent free of aliphatic unsaturation, which is inert to the polyacetylene up to carbonization temperatures having a boiling point in the range of from about 120°C to about 220°C. Included by the volatile organic plasticizers are chlorobenzene, ortho-dichlorobenzene, para-dichlorobenzene, nitrobenzene, hexamethylphosphorictriamide, and N-methyl pyrrolidone.

The substantially non-volatile plasticizers which can be employed in the practice of the present invention are any aliphatically unsaturated organic compounds having at least 90 percent by weight of chemically combined carbon, a melting point of less than about 120°C, a boiling point of at least 250°C, and a molecular the production of voids in the fiber during subsequent heat treating steps such as the drawing of the fiber, crosslinking of the fiber, etc. It has been found under such circumstances that the role of the non-volatile plasticizer is more effectively achieved because it can serve to plasticize the extrudate without the effects caused by rapid flashing of the volatile plasticizer. In addition, aging the drawn fiber at up to about 90°C before crosslinking can result in further loss of volatile plasticizer and can result in even stronger crosslinked precursor fiber.

It has been found that prior to graphitization, in addition to the advantages of being able to make graphite precursors, substantially free of voids, in many instances the heat stabilized polyacetylene extrudate can have a greater tensile strength than extrudate free of non-volatile plasticizer. This advantage of increased tensile strength can be used to advantage during the stress graphitization of the heat stabilized polyacetylene because it can be subjected to a higher initial stress prior to and during graphitization. Naturally, those skilled in the art know that under carbonization or graphitization conditions, which can utilize temperatures in the range of from about 1,000°C up to 3,300°C that substantially non-oxidizing conditions must be employed such as achieved with use of a vacuum or an inert gas such as noble gas, for example, argon, etc. Stresses in the range of up to $1 \times 10^5$ psi, and preferably 5,000 psi to 20,000 psi can be employed to convert the heat stabilized polyacetylene fiber to the graphitized state.

In order that those skilled in the art will be better able to practice the invention, the following examples are given by way of illustration and not by way of limitation. All parts are by weight.

EXAMPLE 1

Polyacetylene was made by effecting reaction between the dipropargyl ether of 2,2-bis(4-hydroxyphenyl) propane (Bisphenol-A), meta-diethynylbenzene and para-diethynylbenzene, utilizing an oxidative coupling catalyst produced with cuprous chloride, N,N,N',N'-tetramethylenediamine, and a solvent mixture of pyridine and orthodichlorobenzene by the following procedure:

There was added a solution of about 25 parts of dichlorobenzene of 0.5 parts of the dipropargyl ether of bisphenol-A, 4.1 parts of meta-diethynylbenzene, and 0.4 part of para-diethynylbenzene to a mixture of 0.15 part of cuprous chloride, about 0.18 part of N,N,N',N'-tetramethylethylene diamine dissolved in an oxygenated solution of about 1.7 parts of pyridine and 75 parts of ortho-dichlorobenzene at 60°C. The temperature of the mixture rose to 885°C while it was stirred after about 2 minutes. The mixture also became too thick to stir. After 10 minutes the mixture was allowed to cool to room temperature, and added to excess methanol containing a trace of hydrochloric acid. There was obtained a quantitative yield of polyacetylene having an intrinsic viscosity in ortho-dichlorobenzene at 120°C of 0.77 dl/g.

A blend "A" of the above polyacetylene and ortho-dichlorobenzene was prepared containing 2 1/2 parts of ortho-dichlorobenzene per part of polyacetylene. Another blend "B" was prepared containing, per part of polyacetylene, 0.1 part of 1,4-diphenylbutadiyne and 2 ½ parts of orthodichlorobenzene. Blends "A" and "B" were processed identically. Fibers contained by extruding the respective mixtures through a 3 mil die at 135°C, were stored in the absence of light at 5°C for 3 days. The fibers were then drawn 600 percent under a constant strain over a 180°C pin. The fibers were then heat stabilized at 350°C by passing over a heated shoe.

The above heat stabilized fibers are then passed directly through an induction heated furnace in an argon atmosphere, at rates ranging from 1 ½ inch to 6 inches per minute. The temperature of 2,950°C is maintained in the induction heated furnace. A load of 1,500 psi to 20,000 psi is maintained on the fibers. During the passage of the fibers through the heating zone, there are obtained 1 ½ to 2 foot lengths of graphitized material from each of the heat stabilized fibers derived from the starting blends. It is found that the graphite fiber "A" derived from the blend of polyacetylene and the ortho-dichlorobenzene has an average tensile strength of $320 \times 10^3$ psi, and a modulus of $66 \times 10^6$ psi; the graphitized fiber "B" derived from the blend of the polyacetylene, the ortho-dichlorobenzene, and the 1,4-diphenylbutadiyne has a tensile strength of $353 \times 10^3$ psi, and a modulus of $90 \times 10^6$ psi. The presence of the 1,4-diphenylbutadiyne in extrudate "B" is found to impart an advantage to the polyacetylene fiber during stress graphitization, which is not shown by extrudate "A" free of the 1,4-diphenylbutadiyne. The presence of the ortho-dichlorobenzene in blend "A" and "B", however, during the initial extrusion, allows the extrusion of polyacetylene through orifices as low as 3 mil or less, and provides extrudate which can be drawn and converted to graphite fiber having diameters as low as 0.3 mil.

EXAMPLE 2

A polyacetylene is prepared in accordance with the teaching of Hay U.S. Pat. No. 3,300,456, utilizing a mixture of meta-diethynylbenzene and para-diethynylbenzene. Co-polymerization is achieved by oxidative coupling utilizing a mixture of cuprous chloride, N,N,N',N'-tetra-methylethylene diamine and pyridine, as described in Example 1 above. There is obtained a polyacetylene consisting essentially of chemically combined meta-diethynylbenzene units and para-diethynylbenzene units. The yield of the polyacetylene was quantitative and it had an intrinsic viscosity in ortho-dichlorobenzene of 1.0 dl/g at 125°C.

A blend "C" of the above polyacetylene and orthodichlorobenzene is prepared employing 2 ½ parts of orthodichlorobenzene, per part of polyacetylene. Another blend "D" of the polyacetylene is prepared utilizing per part of polyacetylene, 2 ½ parts of ortho-dichlorobenzene and 0.1 part of 1,4-diphenylbutadiyne. The blends are processed as described in Example 1 to produce a heat treated polyacetylene fiber.

Heat stabilized fibers "C" and "D" are then graphitized in accordance with the method of Example 1. There is obtained from heat stabilized fiber "D" containing 1,4-diphenylbutadiyne, graphite fiber having an average tensile strength of $364 \times 10^3$ psi. Graphitized fiber "C" derived from the blend free of 1,4-diphenylbutadiyne has an average tensile strength of only $164 \times 10^3$ psi. The non-volatile plasticizer provides unexpected improvement in the tensile strength of graphite fiber, while the presence of ortho-dichlorobenzene in extrudates "C" and "D" allows for the production of polyacetylene extrudate over a wide range in average diameters, such as from 2 to 10 mil in diameter. The advantage of drawing the extrudate to achieve fiber of lower diameter, while effecting the ready volatilization of the plasticizer from the drawn extrudate, permits drawing to a desired diameter, while avoiding sagging due to the retention of excessive plasticizer.

EXAMPLE 3

A blend "E" was prepared following the procedure utilized in making blend "B" of Example 1, except in place of 0.1 part of 1,4-diphenylbutadiyne, there is employed 0.1 part of cis-1,4-diphenylbutenyne. Blend "E" is found to perform substantially as blend "B" with respect to providing plasticizing action of the heat treated extrudate during carbonization and graphitization.

Graphite fibers are made from blend "E" having an average diameter of about 0.8 mil, and a length of about 6 inches. A bundle of about 20 graphite fibers is clamped in a horizontal position. The bundle is then treated with a 10 percent solution of an epoxy resin in methylethyl ketone employing a micro pipette. The treated fibers are then placed into an oven at 60°C for 45 seconds to effect the evaporation of the solvent. There is obtained a prepreg which is cut into 1 ½ inch pieces. The epoxy resin employed contains as essential ingredients a bis-phenol epichlorohydrin reaction product, and a methyl nadic anhydride curing agent.

The above 1 ½ inch prepregs are put into a cold mold and cured under 600 psi for 1 hour at 150°C, and 16 hours at 175°C in an air oven. There is obtained a composite exhibiting valuable characteristics and useful for making high strength laminates and molded parts.

Although the above examples are limited to the employment of a very few polyacetylenes, volatile plasticizers and substantially non-volatile plasticizers, it should be understood that the method of the invention is directed to making polyacetylene fiber by extruding blends derived from the employment of a much broader class of polyacetylenes, volatile organic plasticizer and substantially non-volatile organic plasticizers.

What we claim as new and desire to secure by Letters Patent of the United States:

1. In a method for making polyacetylene fiber convertible to high strength graphite at graphitization temperatures up to 3,300°C while under non-oxidizing conditions, the improvement of making the polyacetylene fiber from an extrudate of a blend of polyacetylene and a mixture of a volatile organic plasticizer selected from the class consisting of chlorobenzene, orthodichlorobenzene, paradichlorobenzene, nitrobenzene, hexamethylphosphorictriamide, and N-methylpyrrolidone, and a substantially non-volatile organic plasticizer, in the form of an aliphatically unsaturated organic compound having at least 90 percent by weight of chemically combined carbon, a melting point of less than about 120°C, a boiling point of at least 250°C, and a molecular weight in the range of from about 200–500, where there is employed in said mixture from about 1–10 parts of the volatile plasticizer and from 0.01 to 1 part per part of the polyacetylene of the non-volatile plasticizer.

2. A method in accordance with claim 1, where the polyacetylene consists essentially of chemically combined units of the dipropargyl ether of 2,2-bis(4-hydroxyphenyl)-propane, meta-diethynylbenzene units and para-diethynylbenzene units.

3. A method in accordance with claim 1, where the polyacetylene consists essentially of chemically combined meta-diethynylbenzene units and para-diethynylbenzene units.

4. A method in accordance with claim 1, where there is utilized a mixture of ortho-dichlorobenzene and 1,4-diphenylbutadiyne.

5. A method in accordance with claim 1, where there is utilized a mixture of ortho-dichlorobenzene and 1,4-diphenyl-cis-butenyne.

6. A method in accordance with claim 1, which comprises extruding a blend of a polyacetylene, orthodichlorobenzene, and 1,4-diphenylbutadiyne, at a temperature up to 150°C, and thereafter drawing the resulting extrudate up to 600 percent of its initial length and heat stabilizing the resulting fiber at a temperature up to 1,000°C, where the polyacetylene is a terpolymer consisting essentially of chemically combined units derived from the dipropargyl ether of 2,2-bis(4-hydroxyphenyl)-propane, meta-diethynylbenzene, and para-diethynylbenzene.

7. A method in accordance with claim 6, where the extrudate is allowed to age for 12 to 45 hours at a temperature between 0° to 25°C prior to drawing.

* * * * *